United States Patent [19]

Herchenbach et al.

[11] 4,318,630

[45] Mar. 9, 1982

[54] LOCKING DEVICE FOR A SHAFT COUPLING MECHANISM

[75] Inventors: Paul Herchenbach, Ruppichteroth, Fed. Rep. of Germany; Manfred Struck, Quevedo, Ecuador

[73] Assignee: Jean Walterscheid GmbH, Rheinland, Fed. Rep. of Germany

[21] Appl. No.: 148,597

[22] Filed: May 12, 1980

[30] Foreign Application Priority Data

May 12, 1979 [DE] Fed. Rep. of Germany ....... 2919214

[51] Int. Cl.³ .................. B25G 3/18; F16B 21/00; F16D 1/00
[52] U.S. Cl. .................................. 403/322; 403/325; 403/359; 285/316
[58] Field of Search ................. 285/86, 316; 403/322, 403/325, 359

[56] References Cited

U.S. PATENT DOCUMENTS

| Re. 27,364 | 5/1972 | German ........................... 285/316 X |
| 3,337,244 | 8/1967 | Appleberry ...................... 285/316 X |
| 3,613,726 | 10/1971 | Torres .............................. 285/86 X |
| 3,649,053 | 3/1972 | Snyder ............................ 285/316 X |
| 3,747,966 | 7/1973 | Wilkes ............................. 285/277 X |
| 4,000,917 | 1/1977 | Poehlmann ..................... 285/316 X |

FOREIGN PATENT DOCUMENTS 2140467  3/1972  Fed. Rep. of Germany ...... 403/322
591631   4/1976  U.S.S.R. ............................. 403/322

Primary Examiner—Wayne L. Shedd
Attorney, Agent, or Firm—Toren, McGeady & Stanger

[57] ABSTRACT

A locking device for coupling an externally splined power take-off shaft with an internally splined coupling hub which may be part of a universal joint shaft of an agricultural implement, including locking elements which are radially movable between an inner locking position and an outer unlocking position, the elements being engaged in the locking position with a circumferential groove in the power take-off shaft. A retaining member is axially slideable on the coupling hub to a position to engage the locking elements to hold them in their radially inward locking position. Insertion of the power take-off shaft into the coupling hub causes an actuator device which includes radially movable members extending into the bore of the coupling hub to be moved radially outwardly by engagement with the power take-off shaft thereby to engage the retainer member to urge the retainer member toward its position holding the locking elements in the radially inward locking position. The actuator device may comprise spherical balls radially movable within an aperture in the coupling hub and a frusto-conical spring member engaged between the coupling hub and the retainer member to apply a resilient force to the retainer member when the spherical balls are urged radially outwardly by the power take-off shaft.

11 Claims, 4 Drawing Figures

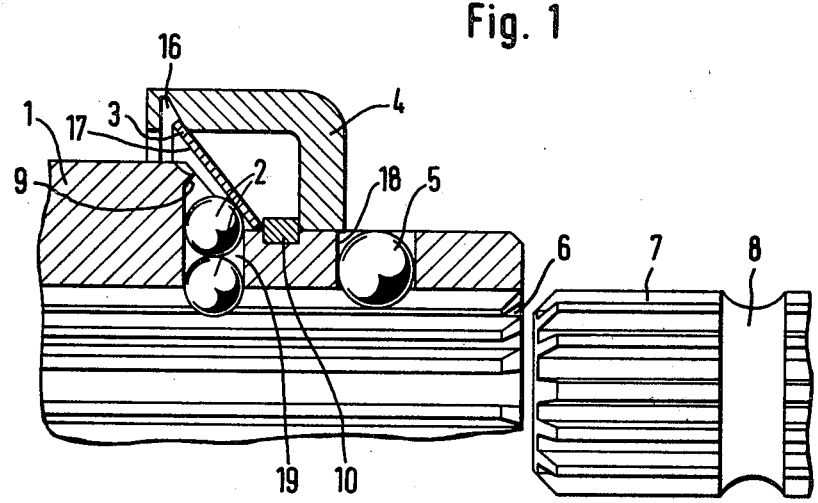
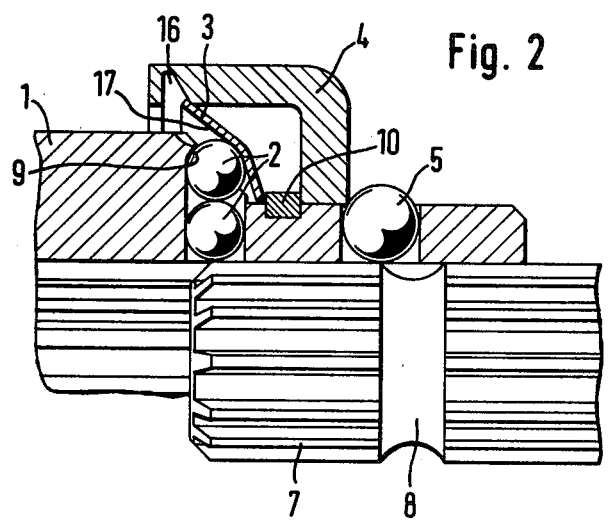

LOCKING DEVICE FOR A SHAFT COUPLING MECHANISM

The present invention relates generally to a mechanism for coupling a pair of shafts and more particularly to a locking device for locking the connection between the two shafts. The invention is particularly applicable in connection with a coupling device for coupling the universal joint shaft of an agricultural implement with the power take-off shaft of a tractor.

The invention is more specifically intended for utilization with a locking mechanism wherein a coupling sleeve is formed with an internal bore into which the power take-off shaft is received. Locking members are guided for radial movement within apertures formed to extend through the coupling sleeve and, when in the locking position, the locking members extend radially inwardly of the sleeve into the bore and will engage the power take-off shaft, for example by engagement within an annular groove formed therein. The invention is directed toward a device which will automatically cause a locking sleeve to move to hold the locking members in their radially inward locking position when the power take-off shaft is inserted into the bore of the coupling sleeve.

In the prior art, for example German Auslegeschrift 2,241,887, a slide lock is known wich may be locked in the open position wherein three balls which are uniformly distributed over the circumference serve as locking members held in the locking position by means of a locking ring. In order to lock the slide lock in the open position, after a cover cap is pulled a control pin is moved radially inwardly whereby a ring is shifted from a central position into an eccentric position while simultaneously engaging in an annular groove.

In this case, the locking ring bears against the ring against the force of the locking spring and is held in the open position. When the coupling sleeve which is equipped with the known slide lock is moved onto, for example, the power take-off shaft of the tractor, the locking balls are positively centered by a chamfer of the power take-off shaft and the ring maintaining the open position is transferred into a central position by means of at least one of the three locking balls and is pushed out of the groove. The locking sleeve may then move into the locking position in order to lock the slide lock.

This prior art design involves a disadvantage in that the locking sleeve must be pushed out of its locking position while the control pin is simultaneously pressed radially outwardly. Thus, in order to transfer the slide lock into the open position, it is always necessary to utilize two hands. Furthermore, in the known design there arises the disadvantage that the locking members simultaneously serve as release members for cancelling the open position of the slide lock. Since, because of the narrow free space available between an agricultural tractor and a mounted implement, it frequently becomes very difficult to slide the coupling sleeve onto the power take-off shaft, it may happen that the open position of the slide lock is cancelled just when the locking members engage the end of the power take-off shaft and before the locking members have made full contact with the cylindrical portion of the power take-off shaft. The slide lock would then move abruptly into the locking position and it would be necessary to manually bring it into the open position again.

Accordingly, the present invention is directed toward provision of a locking device which is simple to manipulate and wherein, when the coupling sleeve is slid onto the shaft to be received, there occurs a positive locking action.

SUMMARY OF THE INVENTION

Briefly, the present invention may be described as a locking device for coupling a first and a second shaft comprising a coupling hub or sleeve which is affixed to the first shaft and which has an inner surface defining a bore into which the second shaft is received for coupling engagement. First aperture means are defined in the coupling hub and locking means are operatively received in said first aperture means for movement radially between a first locking position and a second unlocking position. Recess means formed in the second shaft are adapted to have the locking means received therein for effecting locking engagement between the first and the second shafts. The device includes retainer means which are movable between a first position where the retainer means operate to retain the lock means in the first locking position, and a second position where the retainer means release the lock means and enable movement of the lock means to the second unlocking position. Second aperture means are formed in the coupling hub or sleeve at a location spaced axially from the first aperture means. Actuator means operatively arranged in the second aperture means include radially movable means urged by insertion of the second shaft into the coupling hub in order to drive the retainer means to their first position to retain the lock means in the first locking position. The retainer means are formed as a locking sleeve extending about the coupling hub or sleeve. The radially movable means of the actuator means may comprise a feeler member which may essentially be composed of one or a plurality of spherical balls radially movable in the second aperture means of the coupling sleeve. In accordance with the invention, the locking sleeve is held in the open position by the force of an axial spring which is supported at one of its ends by an axial stop on the coupling sleeve and at the other of its ends by a shoulder of the locking sleeve. In a radially outwardly directed movement, the feeler member pushes the locking sleeve into the locking position through a ring which is resiliently held at the locking sleeve and has a conical surface.

The design of the locking device in accordance with the invention has the advantage that, when the connection is not coupled, the locking ring is held in readiness for coupling without the manipulation of a single handle. Since the locking members are locked by means of the shaft to be inserted, there is no danger that the open position will be prematurely cancelled.

In another embodiment of the invention, the open position of the locking sleeve is secured by means of a plate spring having the shape of a truncated cone which is supported at one of its ends by an axial stop of the coupling sleeve and at the other of its ends by a collar of the locking sleeve wherein the plate sleeve includes the conical surface.

The plate spring which, in this embodiment, is the only spring provided which acts in the axial direction, has the purpose of maintaining the locking device in the open position when the shaft is not inserted and, due to its design which is in the shape of a truncated cone, it also operates to convert the radially outwardly directed movement of the feeler members into an axial movement of the locking sleeve wherein, with its outer edge, it simultaneously acts resiliently on the locking sleeve so that the later is held in a spring loaded manner in readiness for locking until the locking member or members fall into the annular groove which serves as the axial locking means.

In accordance with a further embodiment of the invention, a first axial spring which secures the open position of the coupling sleeve is constructed as a helical spring and a second axial spring is supported at one end by the locking sleeve and at another end by a projection connected to the locking sleeve and through a separate control ring which is constructed, at least partially, in the shape of a truncated cone.

In this embodiment, the first axial spring serves the purpose of securing the open position of the locking sleeve while the second axial spring insures the resilient contact of the locking sleeve with the locking members until the latter fall into the annular groove, when the feeler member or members act on the control ring which is partially constructed in the shape of a truncated cone.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described perferred embodiments of the invention.

DETAILED DESCRIPTION OF THE DRAWINGS

In the drawings:

FIG. 1 is a cross-sectional view showing a locking device in accordance with the present invention constructed with a single axial spring with the plate spring shown in the normal position of the uncoupled state;

FIG. 2 is a cross-sectional view of the device of FIG. 1 shown at the beginning of reversal into the locked state;

DETAILED DESCRIPTION OF PREFERRED EMBODIMENTS

Figure 3:
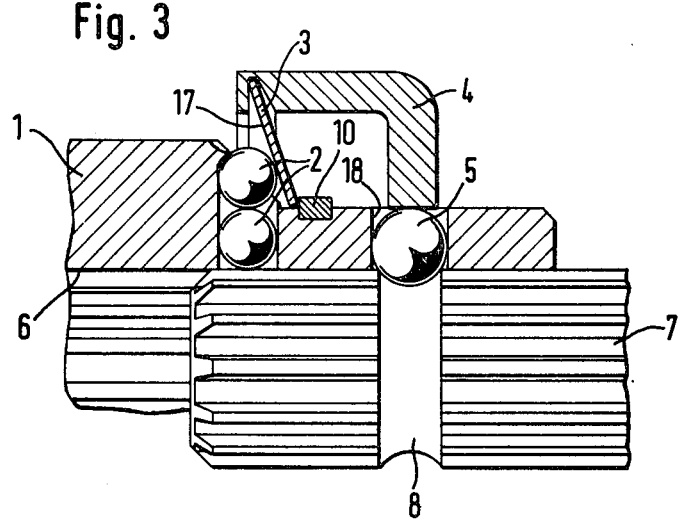
FIG. 3 is a cross-sectional view of the locking device of the invention shown in the fully locked position.

Referring now to the drawings, wherein similar reference numerals are used to refer to like parts throughout the figures thereof, there is shown in FIG. 1 a locking device in accordance with the present invention shown in the uncoupled state. The device includes a coupling hub or sleeve 1 and a power take-off shaft 7 which may be inserted into the sleeve 1 to effect coupling engagement therebetween.

A plate spring 3 is supported at one of its ends by an axial stop 10 formed in the coupling sleeve 1 and at its other end the spring is supported by a shoulder 16 of a locking sleeve 4. The locking sleeve 4 is accordingly held in the open position by the spring 3 and the device is further provided with locking members 5 which can move freely through an aperture 18 formed in the coupling sleeve 1.

A second aperture 19 is formed in the coupling sleeve 1 at a location spaced axially from the aperture 18 and in the aperture 19 there is arranged a feeler member 2 which in the case illustrated in FIG. 1 is formed to comprise a pair of interacting spherical balls. The feeler member 2 bears against the plate spring 3 and a shoulder 9 formed in the sidewall of the aperture 19 secures the feeler member 2 against excessive outward radially directed movement. Obviously, the locking member 5 and the feeler member 2 must be retained in their operative positions; and of the usual means for this purpose may be used.

When the power take-off shaft 7 is slideably engaged into the coupling sleeve 1, the locking members 5, which may be provided in a circumferentially distributed pattern about the sleeve 1, may move radially outwardly within the aperture 18 without obstructing movement of the shaft 5 into the internal bore 6 of the coupling sleeve or hub 1. When the end of the power take-off shaft 7 reaches the spherical balls 2, the balls will be moved radially outwardly as a result of engagement with the shaft 7 and, as illustrated in FIG. 2, the locking sleeve 4 will be moved in a direction toward the locking direction of the device as a result of engagement of the balls 2 with a conical surface 17 of the plate spring 3. The locking sleeve 4 will bear against the locking members or balls 5 under the force of the plate spring 3 and when the coupling sleeve 1 has fully received the shaft 7 to an extent such that the apertures 18 are in axial alignment with an annular groove 8 formed in the shaft 7, which groove serves as the axial locking means for the device, the locking sleeve 4 will be free to move over the locking members 5 as a result of the initial tension created in the spring member 3 by the balls 2 and the sleeve 5 will therefore press and hold the balls 5 radially inwardly in engagement with the annular groove 8. As a result, the coupling sleeve 1 will be secured together with the shaft 7 to prevent release or separation thereof.

In order to again effect release of the coupling between the sleeve 1 and the shaft 7, the locking ring 4 is moved against the force of the plate spring 3 in the direction to the left as shown in FIGS. 1-3 or toward the feeler members 2. It will be seen that with the shaft 7 in the position illustrated in FIG. 3, the spring 3 will be flexed against the balls 2 as shown in FIG. 2. However, as soon as the sleeve 4 has moved to release the locking members or balls 5, the balls 5 may move radially outwardly and the shaft 7 may be withdrawn from the bore 6 whereupon the balls 2 may again slide radially inwardly to release the spring tension.

Figure 4:
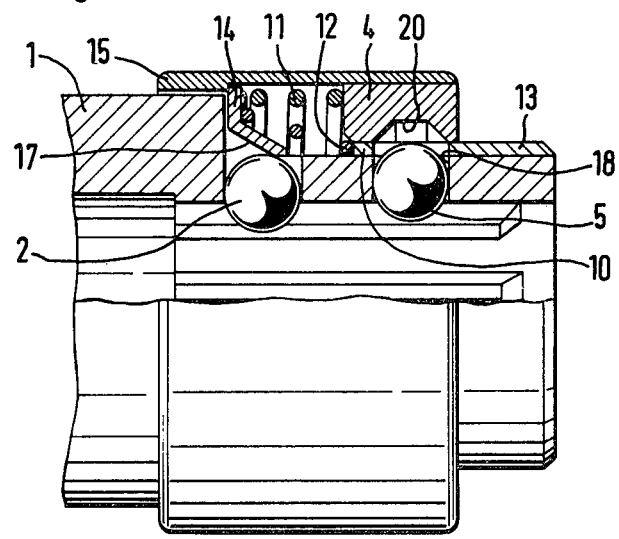
FIG. 4 is a partial sectional view showing a further embodiment of the locking device with a separate control ring constructed partially in the shape of a truncated cone and two axial springs which secure operation.

A further embodiment of the invention is illustrated in FIG. 4 wherein a support sleeve 13 is provided at the outer end of the coupling sleeve 1. The support sleeve 13 is provided with an aperture which corresponds to the aperture 18 shown in the embodiment of FIGS. 1-3. Bearing against the support sleeve 13 is a helical spring 12 which has the shape of a truncated cone and which, with its opposite end, bears against a separate control ring 14 which is constructed partially in the shape of a truncated cone. FIG. 4 shows the locking device in the open position. The locking sleeve 4 is provided with an annular groove 20 which, when the device is in the open position, is in alignment with the apertures 18. Accordingly, when the power take-off shaft 7 is inserted into the bore 6 of the coupling sleeve 1, the locking members 5 may move into the free space defined by the annular groove 20. Connected with the locking sleeve 4 is a guide ring 15 which surrounds the coupling sleeve 1 along a portion of its length.

In the free space between the locking ring 4 and the control ring 14, another axial spring 11 is provided which compensates for relative movement between the control ring 14 and the locking sleeve 4.

When the end of the power take-off shaft 7 runs against the feeler members or balls 2, which partially project into the bore 6 of the coupling sleeve 1 when the device is in the open position, the balls 2 will be moved radially outwardly and as a result they will contact the conical surface 17 of the control ring 14. This will effect movement of the control ring 14 in the direction toward the locking sleeve.

The locking sleeve 4 will be able to undergo movement to the right in FIG. 4 until it makes contact with the locking members 5 which project radially outwardly from the support sleeve 13. Further movement of the control ring 14 will be absorbed by the axial spring 11 until the power take-off shaft 7 is moved into the coupling sleeve 1 to an extent sufficient to bring the annular groove 8 into alignment with the apertures 18 of the coupling sleeve 1. Due to the force of the spring 11, the locking ring 4 will now apply a radially inwardly directed force component upon the locking balls 5 thereby pressing the balls 5 into the annular groove 8 of the power take-off shaft 7. The locking ring 4 may now move completely over the locking members 5 thereby effecting locking engagement of the device.

Of course it will be apparent to those skilled in the art that reverse movement of the ring 4, in the manner previously described in connection with the embodiments of FIGS. 1–3, may also operate to unlock the device of FIG. 4.

While specific embodiments of the invention have been shown and described in detail to illustrate the application of the inventive principles, it will be understood that the invention may be embodied otherwise without departing from such principles.

What is claimed is:

1. A locking device for coupling a first and a second shaft comprising: a coupling hub affixed to said first shaft and having an inner surface defining a bore into which said second shaft is received for coupling engagement; first aperture means in said coupling hub; lock means operatively received in said first aperture means for movement radially between a first locking position and a second unlocking position; recess means in said second shaft adapted to have said lock means received therein for effecting locking engagement between said first and said second shafts; retainer means movable between a first position where said retainer means operate to retain said lock means in said first locking position and a second position releasing said lock means and enabling movement thereof to said second unlocking position; second aperture means in said coupling hub axially spaced from said first aperture means in a direction forwardly of said first aperture means taken in the mounting direction of movement of said second shaft; feeler means arranged in said second aperture means for movement radially of said coupling hub, said feeler means being arranged to project radially into said bore when said second shaft is uncoupled from said coupling hub; axial spring means applying a spring force urging said retainer means toward said second releasing position, said axial spring means having a first end supported by an axial stop on said coupling hub and a second end supported by a shoulder of said retainer means; and ring means through which radially outwardly directed movement of said feeler means operates to push said retainer means to said first retaining position, said ring means being resiliently held at said retainer means and being formed with a conical surface.

2. A locking device according to claim 1 wherein said second unlocking position of said retainer means is secured by a plate spring constructed in the shape of a truncated cone which at one of its ends is supported by said axial stop of said coupling hub and which at the other of its ends is supported by said shoulder of said retainer means, said plate spring including said conical surface.

3. A locking device according to claim 1 wherein a a first axial spring which secures said second unlocking position of said retainer means is constructed as a helical spring and wherein a second axial spring is supported at one of its ends by said coupling hub and at its other end by a stop connected with said retainer means through a separate control ring which is at least partially constructed in the shape of a truncated cone.

4. A locking device for coupling a first and a second shaft comprising: a coupling hub affixed to said first shaft and having an inner surface defining a bore into which said second shaft is received for coupling engagement; first aperture means in said coupling hub; lock means operatively received in said first aperture means for movement radially between a first locking position and a second unlocking position; recess means in said second shaft adapted to have said lock means received therein for effecting locking engagement between said first and said second shaft; retainer means movable between a first position where said retainer means operate to retain said lock means in said first locking position and a second position releasing said lock means and enabling movement thereof to said second unlocking position; second aperture means in said coupling hub axially spaced from said first aperture means; and actuator means operatively arranged to extend in said second aperture means and including radially movable means urged by insertion of said second shaft into said coupling hub to drive said retainer means to said first position to retain said lock means in said first locking position.

5. A locking device according to claim 4 further comprising spring means arranged to impart a spring force against said retainer means urging said retainer means toward said first position in response to said urging of said radially movable means by said second shaft.

6. A locking device according to claim 5 wherein said lock means are received in said recess means when said recess means are brought into alignment with said first aperture means; wherein said retainer means are prevented from moving to said first position by said lock means until said recess means move into alignment with said first aperture means; and wherein said spring means operate to maintain said spring force against said retainer means until said lock means are received into said recess means whereupon said retainer means may be moved to said first position by operation of said spring force.

7. A locking device according to claim 4 wherein said lock means prevent said retainer means from moving to said first position when said lock means are in said second unlocking position; wherein said urging of said radially movable means by said second shaft occurs prior to movement of said lock means to said first locking position thereby preventing movement of said retainer means to said first position until after said radially movable means have been urged by said second shaft; and wherein said locking device is further comprised of spring means which absorb the force of said radially movable means created by said urging thereof by said second shaft to store said force and apply said force with delay as a spring force urging said retainer means to said first position after said lock means have moved to said first locking position.

8. A locking device according to claim 4 wherein said actuator means include ring means defining a conical surface engaged by said radially movable means.

9. A locking device according to claim 4 wherein said radially movable means comprise spherical ball means which are urged radially outwardly of said second aperture means by engagement with said second shaft when said second shaft is inserted into said coupling hub and wherein said actuator means further comprise a resilient annular member having a generally frustoconical configuration engaged between said coupling hub and said retainer means and engaged by said spherical ball means to resiliently urge said retainer means to said first position.

10. A locking device according to claim 8 wherein said ring means comprise an annular spring member engaged between said retainer means and said coupling hub and adapted to be deflected by said radially movable means to absorb movement thereof radially outwardly of said coupling hub, said annular spring member operating to develop a spring force as a result of deflection thereof to urge said retainer means to said first position when said lock means have been received in said recess means and have thereby moved to said first locking position.

11. A locking device according to claim 8 wherein said ring means comprise a generally rigid frustoconical member and wherein said locking device further comprises spring means engaged between said frustoconical member and said retainer means, said frustoconical member operating to compress said spring means as a result of forces applied thereto by said radially movable means, said spring means being thereby compressed to apply a spring force to said retainer means urging said retainer means toward said first locking position.

* * * * *